March 29, 1955 H. C. RHODES 2,704,982
DOUGH TWISTER
Original Filed Oct. 20, 1948 2 Sheets-Sheet 1

INVENTOR.
Herbert C. Rhodes
BY
Otto Moeller
Attorney

March 29, 1955     H. C. RHODES     2,704,982
DOUGH TWISTER
Original Filed Oct. 20, 1948     2 Sheets-Sheet 2

INVENTOR.
Herbert C. Rhodes
BY
Otto Moeller
Attorney

United States Patent Office 2,704,982
Patented Mar. 29, 1955

2,704,982

DOUGH TWISTER

Herbert C. Rhodes, Portland, Oreg., assignor to Read Standard Corporation, a corporation of Delaware Original application October 20, 1948, Serial No. 55,475, now Patent No. 2,631,549, dated March 17, 1953. Divided and this application April 24, 1952, Serial No. 284,127

6 Claims. (Cl. 107—9)

This invention relates generally to the bread making industry and particularly to a dough twister.

This application is a division of my co-pending application Serial No. 55,475, filed October 20, 1948, now Patent Number 2,631,549, dated March 17, 1953.

The main object of the invention is to provide a machine for twisting the dough before being placed in the pan for baking for the purpose of changing the grain and closing holes in the dough and retarding the drying action of the bread by the elongation and distortion of the holes.

Another object is to provide a dough kneading machine whereby a more completely uniform texture is insured throughout the entire mass of the dough pieces.

Figure 2:
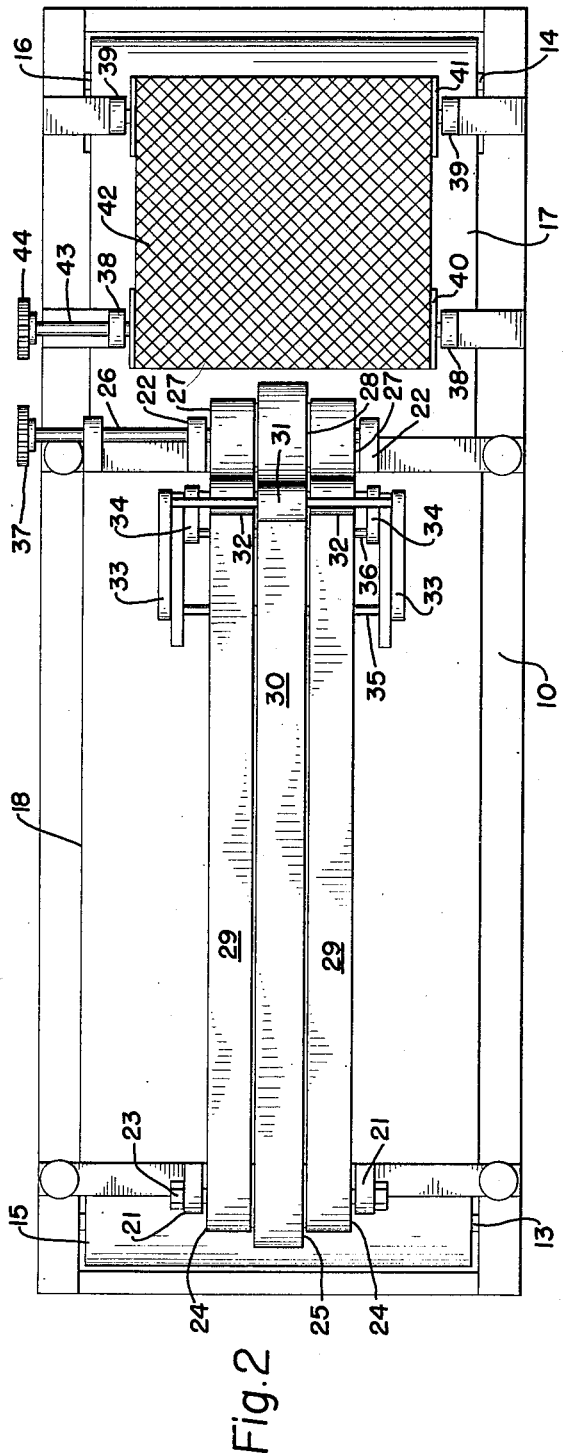
Figure 1:
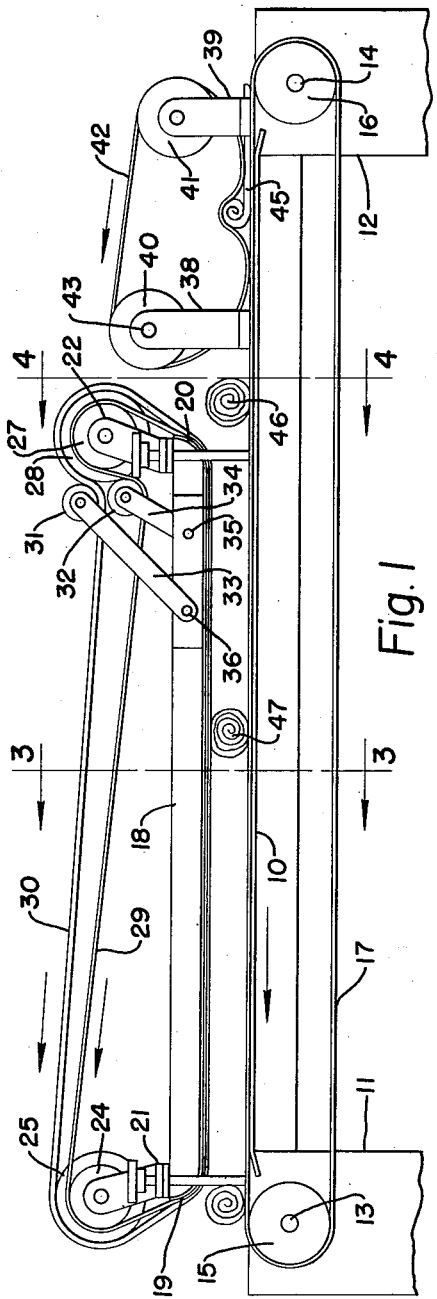
Figure 3:
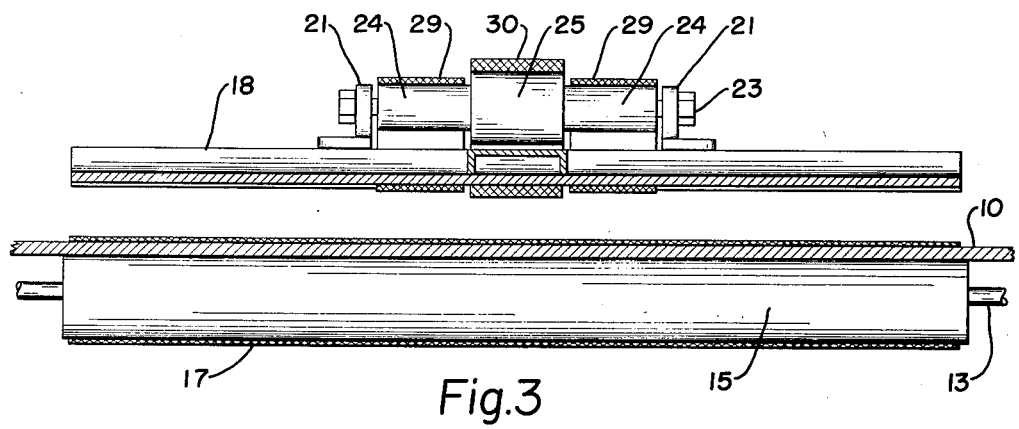
Figure 4:
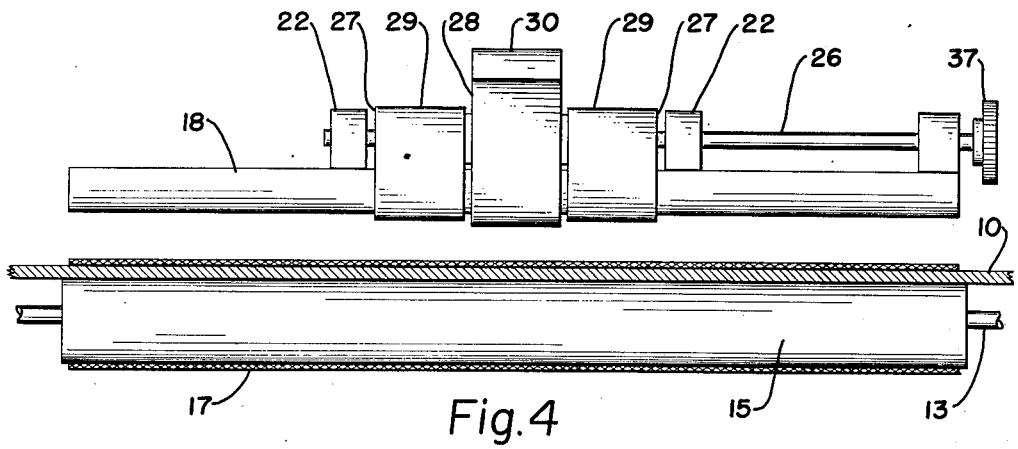

I accomplish these and other objects in the manner set forth in the following specification as illustrated in the accompanying drawings, in which:

Figure 1 is a side elevation of the machine;
Figure 2 is a plan view of the machine;
Figure 3 is a sectional view taken on the line 3—3 of Figure 1; and
Figure 4 is a sectional view taken on the line 4—4 of Figure 1.

Like numbers of reference refer to the same or similar parts throughout the several views.

Referring in detail to the drawings, there is shown a table 10 mounted on the legs 11 and 12. Mounted across the opposite ends of the table 10 are the shafts 13 and 14 on which are mounted the pulleys 15 and 16, and around which pulleys pass the apron or endless conveyor 17, the top run of which rides upon the table 10.

The endless conveyor 17 may be driven by any suitable means (not shown), power being supplied through either of the shafts 13 or 14.

Above the table 10 is mounted the horizontal frame 18, above whose rounded ends 19 and 20 are secured, respectively, the transversely spaced standards 21 and transversely spaced standards 22. The standards 21 support a transversely extending bolt 23, upon which the rotatable pulleys 24 and 25 are mounted. The pulley 25, disposed between the pair of pulleys 24, has a diameter different than and as shown in the drawings greater than the diameter of the pulleys 24.

Carried by the standards 22 is a transversely extending shaft 26 on which are mounted the rotatable drive pulleys 27 and 28. The pulleys 27 equal in diameter the pulleys 24 and the pulley 28 equals in diameter the pulley 25.

The belts 29 pass around the pulleys 24 and 27 and a belt 30 passes around the pulleys 25 and 28. The lower runs of the belts 29 and 30 ride along the under side of the horizontal frame 18.

Belt tightening pulleys 31 and 32 are mounted on the arms 33 and 34 which are hingedly attached to the frame 18 by means of the pins 35 and 36. Power is supplied to the shaft 26 from any convenient source of power through the sprocket wheel 37 which is secured on the end of an extension of the shaft 26.

Mounted on the table 10 are the standards 38 and 39 which support the transversely extending longitudinally spaced rollers 40 and 41, around which rollers is loosely passed the wire cloth belt 42, to which motion is imparted by the roller 40 through its shaft 43 on which is secured a sprocket wheel 44 to which power may be supplied from any convenient source (not shown).

The operation of the device is as follows. Assuming that a sheet of dough 45 is fed onto the table 10 by means of the conveyor 17 beneath the lower run of the belt 42, which is traveling in a direction opposite the direction of travel of the upper run of the conveyor 17, it can be seen that the dough will be coiled to form an elongated roll of dough which is carried forward by the conveyor 17 underneath the belts 29 and 30.

It will be noted that the central belt 30 is somewhat thicker than the outer belts 29 and therefore projects somewhat below the outer belts as shown in Figure 3, thereby placing it in somewhat greater pressure contact with the roll of dough 46.

It will be observed that the pulleys 27 and 28 are on the same shaft 26 and will be driven at the same speed but, having different diameters, the pulley 28 will drive the belt 30 faster than the pulleys 27 will drive the belts 29. The result is the impartation of a twisting motion to the roll of dough 47 throughout the length of its travel toward the discharge end of the machine.

It can be seen from the foregoing that without the use of additional equipment, or the expenditure of time, desirable twisting action is imparted while moulding the dough and the texture of the bread is greatly improved.

I claim:

1. A dough working machine comprising a pair of spaced opposed endless conveyors providing between them a dough conveying passage, one of said conveyors including three endless belts disposed in juxtaposition, means to drive said endless conveyors, the drive for said one conveyor including means to operate the intermediate of said juxtaposed belts at a greater linear speed than the outer of said juxtaposed belts.

2. A dough working machine comprising an endless conveyor having a horizontally disposed top run, three endless belts disposed in juxtaposition having horizontally disposed bottom runs overlying and spaced from the top run of said endless conveyor to provide therebetween a dough conveying passage, means to drive said endless conveyor and said belts, the drive for said belts including means to operate the intermediate of said juxtaposed belts at a greater linear speed than the outer of said juxtaposed belts.

3. A dough working machine comprising an endless conveyor and pulleys therefor with horizontal axes, three endless belts disposed in juxtaposition and individual pulleys therefor with horizontal axes, said endless belts being mounted in spaced relation over said endless conveyor to provide therebetween a dough conveying passage, and means for driving said endless conveyor and said endless belts through said pulleys, said driving means including a common drive for said endless belt pulleys, the pulleys for the intermediate of said juxtaposed belts having a greater diameter than the pulleys of the outer belts for operating said intermediate belt at a greater linear speed than said outer belts.

4. A dough working machine in accordance with claim 3, wherein the lower run of the intermediate belt is disposed nearer the top run of said endless conveyor than are the lower runs of said outer belts.

5. In a dough working machine, the combination of two molding elements having spaced opposed surfaces forming therebetween a molding chamber to receive and roll a piece of dough longitudinally of the chamber, one of said elements including a plurality of endless belts disposed to provide a plurality of longitudinally extending side by side belt surfaces for conjointly contacting a piece of dough in the said molding chamber, the opposed surfaces of said molding elements being straight and parallel in any transverse cross section, and means to drive said endless belts including means for operating different of said dough contacting belt surfaces at different relative linear speeds for rolling the dough piece longitudinally through said chamber.

6. In a dough working machine, the combination of two molding elements having spaced opposed surfaces forming therebetween a molding chamber to receive and roll a piece of dough longitudinally of the chamber, one of said elements including three endless belts disposed in juxtaposition providing three longitudinally extending belt surfaces for conjointly contacting a piece of dough in the said molding chamber, and means to drive said endless belts including means to operate the intermediate of said juxtaposed belts at a greater linear speed than the outer of said juxtaposed belts.

References Cited in the file of this patent

UNITED STATES PATENTS

| | | |
|---|---|---|
| 296,901 | Wick | Apr. 15, 1884 |
| 1,866,213 | Kirchhoff | July 5, 1932 |
| 2,293,109 | Bridge | Aug. 18, 1942 |
| 2,343,521 | Benning | Mar. 7, 1944 |